(12) United States Patent
Li et al.

(10) Patent No.: US 7,593,340 B2
(45) Date of Patent: Sep. 22, 2009

(54) METHOD AND SYSTEM FOR MULTI-DOMAIN ROUTE COMPUTATION

(75) Inventors: Qiming Li, Shenzhen (CN); Huiying Xu, Shenzhen (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 357 days.

(21) Appl. No.: 11/809,409

(22) Filed: Jun. 1, 2007

(65) Prior Publication Data

US 2008/0002664 A1 Jan. 3, 2008

(30) Foreign Application Priority Data

Jun. 2, 2006 (CN) .................... 2006 1 0060993

(51) Int. Cl.
*G06F 15/173* (2006.01)
*H04L 12/24* (2006.01)
*H04L 12/56* (2006.01)

(52) U.S. Cl. ................ 370/235; 370/400; 370/401; 709/238

(58) Field of Classification Search ............ None
See application file for complete search history.

(56) References Cited

U.S. PATENT DOCUMENTS

| | | | | |
|---|---|---|---|---|
| 7,406,481 | B2* | 7/2008 | Saha et al. ............... | 707/104.1 |
| 7,496,105 | B2* | 2/2009 | Vasseur et al. ........... | 370/401 |
| 7,512,063 | B2* | 3/2009 | Vasseur et al. ........... | 370/217 |
| 7,515,529 | B2* | 4/2009 | Vasseur et al. ........... | 370/221 |
| 2004/0184441 | A1 | 9/2004 | Wu et al. | |
| 2007/0058568 | A1* | 3/2007 | Previdi et al. ............. | 370/254 |
| 2007/0101018 | A1* | 5/2007 | Shirazipour et al. ...... | 709/238 |
| 2007/0217419 | A1* | 9/2007 | Vasseur .................... | 370/392 |

FOREIGN PATENT DOCUMENTS

| | | |
|---|---|---|
| CN | 1509022 | 6/2004 |
| CN | 1710868 | 12/2005 |
| EP | 0 841 824 | 5/1998 |
| EP | 1 460 808 | 9/2004 |
| WO | 2005/119949 | 12/2005 |

OTHER PUBLICATIONS

English abstract of CN 1710868 dated Dec. 21, 2005.
English abstract of CN 1509022 dated Jun. 30, 2004.

* cited by examiner

*Primary Examiner*—Chi H Pham
*Assistant Examiner*—Soon-Dong D Hyun
(74) *Attorney, Agent, or Firm*—Ladas & Parry LLP (57) ABSTRACT

A method and system for multi-domain route computation. In the invention, Path Computation Elements (PCEs) are placed in different layers and computation domains between upper and lower layer PCEs are mapped so that a computation task is divided into multiple computation tasks layer by layer and that the multi-domain route computation is finally fulfilled. The invention separates route computation from signaling and runs route computation tasks in parallel. Route establishment is done by signaling after route computation. The present invention may realize route computation based on complex Traffic Engineering (TE) constraints and enable end-to-end diverse route computation. The invention places PCEs in layers, allowing good scalability and high computation efficiency. The present invention is applicable to the Automatically Switched Optical Network (ASON) and the Multi-Protocol Label Switched Network Traffic Engineering (MPLS-TE) network.

11 Claims, 5 Drawing Sheets

METHOD AND SYSTEM FOR MULTI-DOMAIN ROUTE COMPUTATION

FIELD OF THE INVENTION

The present invention relates to communication technologies, and in particular to a method and system for multi-domain route computation in a communication network.

BACKGROUND OF THE INVENTION

A communication network is a set of geographically distributed nodes and the links between these nodes for data transmission. The communication between two nodes may be realized by way of intermediate nodes. This saves resources of the communication network and improves the resource efficiency. Present communication networks operate in various types, including SDH/SONET networks and IP networks. Different nodes in a communication network communicate with each other by exchanging data frames or packets, which are defined by special protocols like TCP/IP. The protocol herein means a set of rules defining inter-node interaction, similar to TCP/IP.

When a communication network becomes huge, its management and maintenance will be difficult. Usually to facilitate management, the network is divided into multiple routing domains or autonomous systems (ASs). Usually, in the network inside an AS, traditional intra-domain routers that execute intra-domain routing protocols are coupled together and managed by common powers. For the purpose of improving route retractility, an AS is usually divided into multiple areas. Generally, a domain is a set of any network elements within the scope of a common address management or path computation responsibility. An instance of domain, therefore, may be an area, an AS or multiple ASs. For easy description, herein routing domains, ASs and areas are all referred to as domains. The specific meaning of a domain herein depends on its context. When nodes are added for data exchange, inter-domain routers that run inter-domain routing protocols interconnect the nodes in different domains. Such inter-domain routers are also known as border routers.

An instance of inter-domain routing protocol is the Border Gateway Protocol (BGP) version 4 defined in IETF RFC1771. BGP implements inter-domain routing by exchanging routes and reachable information between adjacent inter-domain routers in the system. BGP usually adopts a reliable transmission protocol like TCP to establish connections and sessions.

An instance of intra-domain routing protocol, or Interior Gateway Protocol (IGP), is the Open Shortest Path First (OSPF) protocol defined in IETF RFC2328. OSPF is based on link state technology and therefore is also a link state routing protocol. The link state routing protocol defines the mode of exchanging and handling intra-domain routing information and network topology information. In OSPF, this information is exchanged through Link State Advisement (LSA).

The emergence of Multi-Protocol Label Switching (MPLS) technology meets the new requirements for data network development. For instance, it provides guaranteed available bandwidth and fast recovery MPLS allows establishing end-to-end tunnels in an IP/MPLS network where there are Label Switched Routers (LSRs). Such a tunnel is generally known as a Label Switch Path (LSP). LSP establishment relates to the computation of a path of a LSR in the network, which is called route computation. MPLS is also introduced to the optical transport network and brings the development of the Automatically Switched Optical Network (ASON). Unlike the traditional optical transport network that provides network connection service through manual or semi-automatic configuration, the ASON provides network connection service through automatic establishment of the control plane. The ASON may be divided into a transport plane that bears network services, a management plane that implements management functions, and a control plane that runs the control protocol.

The control plane of ASON uses Generalized Multi-Protocol Label Switching, which extends MPLS to include the Link Management Protocol (LMP), routing protocol and signaling protocol. LMP obtains the connection types the link supports and the number of resources through message exchange based on discovery of neighboring relations. Such information is known as Traffic Engineering (TE) information and a link that contains TE information is a TE link. Inside a domain, the local TE information is advertised to other nodes in the domain through a routing protocol such as OSPF-TE. Based on this information, when the network management system or a user requests the network to establish a network connection, the ingress node of this connection can perform path computation to obtain the link sequence of the connection and then, through a signaling protocol like the Resource Reservation Protocol-Traffic Engineering (RSVP-TE), send a request to the nodes on the path for resource allocation and establish a cross connection. In this way, an end-to-end connection is established.

For both JP/MPLS and optical transport networks, the division of domains is a concern. Especially, when a network with TE management capabilities is divided to multiple domains, each node only knows the TE information of the local domain and the reachable information of other domains. This reduces the impact of topology change on new service deployment and congestion recovery. The network extendability is enhanced. As each node knows only the TE information of the local domain and the reachable information of other domains but does not know the complete TE information of other domains, it becomes an issue how to compute a path that meets all the constraints on end-to-end bandwidth, switching capability, route separation, protection, and user policies in the case of multiple domains.

To solve the route computation or path computation (hereinafter uniformly referred to as route computation for easy description) in the case of multiple domains, the Domain-Domain Routing Protocol (DDRP) adopts a hierarchical network model, in which, a lower layer domain is represented by an agent node. The agent node can advertise abstract topologies, inter-domain links, and reachable addresses that represent the domain. Thus a hierarchical network takes shape. When an end-to-end path that crosses multiple domains is computed, the strict route in the domain of the requesting node and the subsequent loose route of the border node are first computed. When signaling flows to the border of an intermediate domain, the strict route in this intermediate domain is computed by means like domain border computation. This continues until the signaling goes to the domain of the destination node. The defect of this solution is that route computation is a serial process. At the head node, only the ingress and egress information of some domains the path passes is available. Because the real TE information in related domains is unavailable, judgment may be made on whether path computation can succeed from the ingress to egress only when signaling flows to the corresponding domain border and triggers domain border computation. Thus, it may frequently happen that signaling goes to the middle way to discover that no route is available or no root satisfies related constraints. As a result, route establishment is rolled back multiple times, and the previously established cross connection has to be removed for re-establishment. In addition, with the DDRP technology, it is hard to compute end-to-end diverse routes (different paths with the same source and destination).

Another technology that solves the route computation in the case of multiple domains is Path Computation Element (PCE). Each PCE stores all TE information of the domain it serves (for ease of description, the TE information here includes network topology information). A node requesting route computation is called a Path Computation Client (PCC). The PCC sends a request that contains route computation parameters to the PCE, and the PCE performs route computation according to the Traffic Engineering Database (TED) it stores and sends the result to the PCC. A PCE may store TE information of one or multiple domains. When a route crossing multiple domains is computed, if the route is beyond the service area of the local PCE, the PCE will use the Path Computation Element Communication Protocol (PCECP) to collaborate with other related PCEs to compute the final route. The PCE technology adopts a flat single-layer model, in which, all PCEs are equally important. When the network is complex or large, it is difficult to manage the PCEs. In addition, as hierarchical abstraction is not applied to the network, inter-domain route computing entirely relies on the exchange of TE information of different domains between different PCEs. When a service passes through many domains, communication between related PCEs will be too frequent and the volume of information exchanged will be huge. This will reduce the efficiency and reliability of route computation.

SUMMARY OF THE INVENTION

The present invention aims to provide a method and system for multi-domain route computation. It places PCEs in different layers and maps computation domains between upper and lower layer PCEs so that a computation task is divided into multiple computation tasks by layer and that the route computation for multiple domains is finally fulfilled. The present invention separates routes from signaling. Route computation is carried out in parallel and simultaneously in the multiple domains related with the route. The PCE of each layer coordinates in the computation tasks. The route is established by signaling after route computation is completed. By this way, the risk of rollback of route establishment caused by serial route computation in DDRP may be avoided. The present invention may realize route computation based on complex TE constraints and enable end-to-end diverse route computation that cannot be realized by DDRP. The invention places PCEs in different layers, which brings good extendability and high computation efficiency. It may solve the issue of routing in large networks. The invention is applicable to both ASON and MPLS-TE networks.

The objective of the invention is realized by the following technical solution.

A system for multi-domain route computation includes multiple PCEs. Each PCE has a corresponding computation domain. The PCEs form a hierarchy. The computation domain of an upper layer PCE includes the computation domain of a lower layer PCE. When the computation domain of a first PCE includes the computation domain of a second PCE, if there is no third PCE whose computation domain is included by the computation domain of the layer 1 PCE and includes the computation domain of the layer 2 PCE, the computation domain of the layer 1 PCE is regarded to immediately include the computation domain of the layer 2 PCE. In other words, in this system for multi-domain route computation, the layer 1 PCE is the immediate upper layer of the layer 2 PCE and the layer 2 PCE is the immediate lower layer of the layer 1 PCE. The computation domain of a PCE is a network where the PCE serves to perform route computation. A computation domain may include one domain, or multiple domains or part of the network in a domain.

When a PCE has immediate lower layer PCEs, the PCE stores the TE information between the computation domains of the immediate lower layer PCEs. If the computation domain of the PCE further includes some networks, which are not included in the computation domains of other PCEs, the PCE also stores the TE information of these networks, the TE information between these networks, and the TE information between these networks and other computation domains included in its computation domain. The TE information is a set of TE information that may abstract a computation domain as a virtual node, or as multiple virtual nodes that may represent the TE information of the computation domain and the virtual links between the virtual nodes. For instance, domain border nodes are abstracted as virtual nodes. The paths between domain border nodes may include some internal nodes of the domain, which are invisible after the abstraction. In this case, the paths between domain border nodes are abstracted as virtual links. The virtual links and virtual nodes possess TE information of the domain.

When a PCE has no immediate lower layer PCEs, the PCE stores the TE information of the networks included by its computation domain.

When the system for multi-domain route computation performs route computation, the PCE that has immediate lower layer PCEs computes the route between the computation domains of the lower layer PCEs according to the TE information it stores. If the computation domain of this PCE further includes some networks that do not belong to the computation domain of any immediate lower layer PCE, the PCE will compute, if needed, the route between these networks and the computation domains of its immediate lower layer PCEs.

The PCE is a functional entity for route computation. It completes all or part of route computation functions according to the TE information it stores. It may be implemented in a network element, a network management system, a individual server, or other similar devices.

The TE information is the information needed for route computation, such as topology information and link bandwidth.

A method for multi-domain route computation, including: determining, in the system for multi-domain route computation, a PCE whose computation domain may include both the source node and destination node, and the PCE and its lower layer PCEs completing route computation together. The PCE whose computation domain may include the source node and destination node is regarded as the top layer PCE for this route computation (top layer PCE for ease of description).

The method for determining the top layer PCE includes: 1) the source node sends a request for route computation to the PCE whose computation domain includes the source node; 2) the PCE, upon reception of the request for route computation, judges whether the source node and destination node are included in its computation domain, and if not, it forwards the request to its immediate upper layer PCE. This continues until a PCE whose computation domain includes both the source and destination nodes is found. This PCE is the top layer PCE.

The method for determining the top layer PCE further includes: 1) the destination node sends a request for route computation to the PCE whose computation domain includes the destination node; 2) the PCE, upon reception of the request for route computation, judges whether the source node and destination node are included in its computation domain, and if not, it forwards the request to its immediate upper layer PCE. This continues until a PCE whose computation domain includes both the source and destination nodes is found. This PCE is the top layer PCE.

The method for determining the top layer PCE further includes: when a PCE forwards the request for route computation to its immediate upper layer PCE, it reports the route computation result in its computation domain to the immediate upper layer PCE for reference of the immediate upper layer PCE to do route computation.

The method for determining a PCE whose computation domain may include both the source node and destination node includes: the PCE receiving a request for route computation from both the source node and the destination node; or the PCE querying the automatically or manually configured database after receiving a request for route computation; or other prior arts.

In addition to above methods for determining the top layer PCE, the user may specify the top layer PCE directly according to preset information.

The top layer PCE and its lower layer PCEs completing route computation together includes: the top layer PCE completes route computation inside its computation domains; the top layer PCE sends computation tasks to its immediate lower layer PCEs (all immediate lower layer PCEs or related immediate lower layer PCEs, the same hereinafter) according to its computation result; the immediate lower layer PCEs complete route computation in their respective computation domains and send the computation tasks to their immediate lower layer PCEs according to the computation results and this continues until PCEs whose computation domains include no further computation domains complete route computation; from the PCEs whose computation domains include no bier computation domains, the PCEs report route computation results from bottom up layer by layer and the top layer PCE summarizes all the computation results to obtain a final result.

The top layer PCE and its lower layer PCEs completing route computation together further includes: when a PCE finds no route that matches the computation condition, the PCE returns a failure message to its immediate upper layer PCE and this immediate upper layer PCE performs route computation again. If this upper layer PCE still finds no route that matches the computation condition, it sends a failure message to its immediate upper layer PCE, which does route computation again. This continues until the PCE at a certain layer computes a route that matches the condition or cannot compute a route so that the route computation fails.

The present invention brings many benefits: route computation processes can run in parallel, which increases the efficiency of route computation; route computation is performed before a route is established by signaling, which avoids the risk of rollback if route establishment fails; the volume of communication between PCEs is largely reduced; end-to-end diverse route computation is easy to implement; route computation for a large network is easy.

DETAILED DESCRIPTION OF THE EMBODIMENTS

The present invention aims to provide a method and system for multi-domain route computation. It the present invention, PCEs are placed in different layers and computation domains of upper and lower layer PCEs are mapped so that a computation task is divided into multiple computation tasks layer by layer and the route computation for multiple domains is finally fulfilled.

Figure 1:
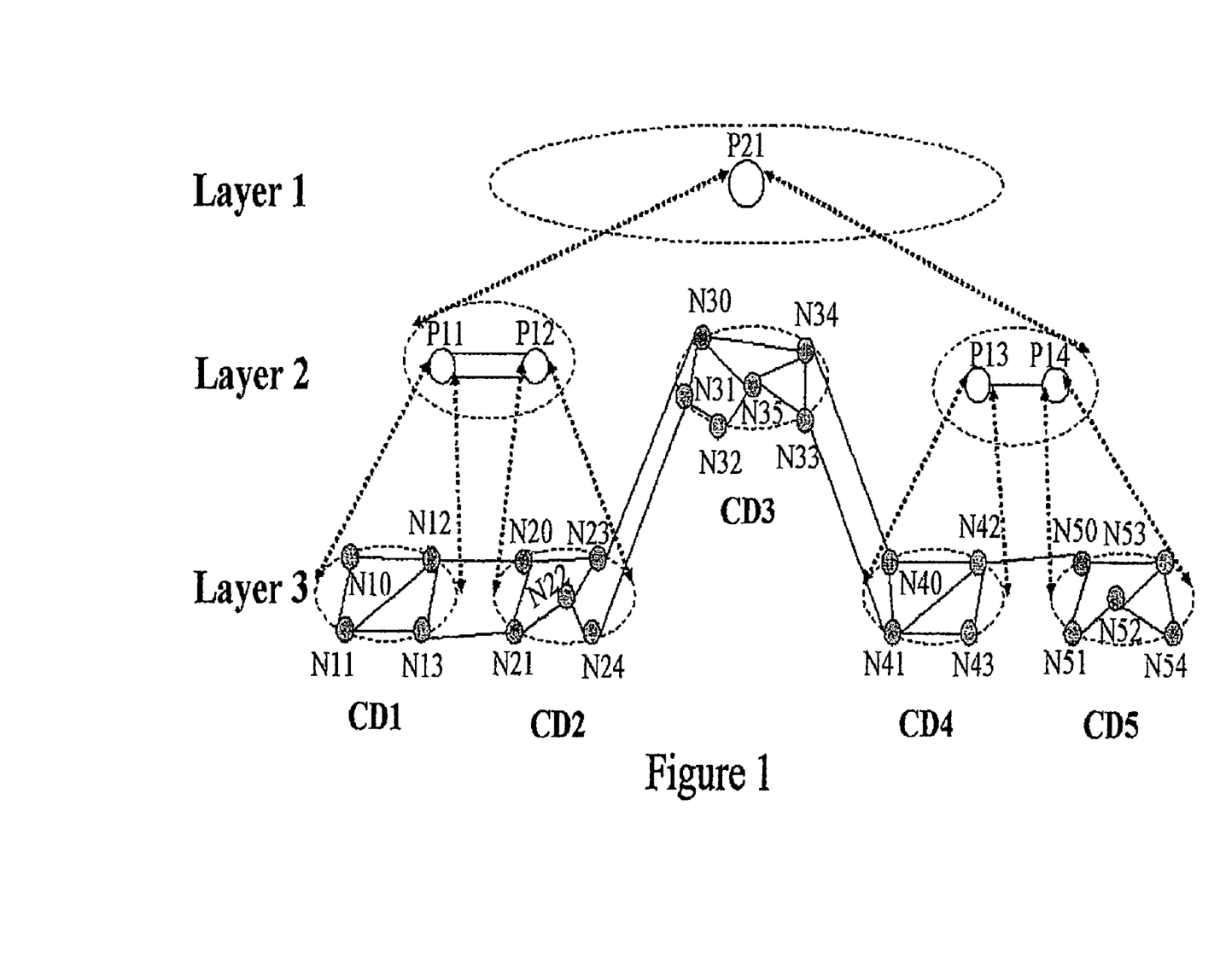
FIG. 1 shows a system for multi-domain route computation according to an embodiment of the invention.

The present invention provides a system for multi-domain route computation. The following describes the implementation of a system for multi-domain route computation that has two layers of PCEs according to all embodiment of the invention, as shown in FIG. 1.

A communication network is made up of network nodes N10-N13, N20-N24, N30-N35, N40-N43 and N50-N54 (marked with small grey circles). The network nodes are connected by links (represented by real lines). These nodes are included respectively into five domains CD1-CD5. For instance, N10-N13 are included in CD1. An inter-domain link is the link between adjacent nodes in two domains. For instance, there are two links connecting CD1 and CD2, namely, the link between N12 and N20 and the link between N13 and N21. Each of these domains is included in the computation domain of a PCE. As shown in FIG. 1, CD1, CD2, CD4 and CD5 are included in the computation domains of P11, P12, P13, and P14 respectively. The PCEs store all topology and TE information in their respective computation domains. The computation domain of P21 includes not only CD3, but also the computation domains of P11-P14. Hence, P21 is regarded to reside at a higher layer than P11-P14. This means, the PCEs serving to do route computation for the communication network are classified into layers.

P11-P14 are at the second layer and P21 is at the first layer in this embodiment. For ease of description, the domains in the communication network are also included in this hierarchy structure. For instance, CD3, as the computation domain of a layer 2 PCE like P11, is included in the computation domain of layer 1 P21, and therefore, is classified to layer 2. Other domains that are included in the computation domains of layer 2 PCEs are classified to layer 3.

There are many methods for classifying layers. Here, a top-down method is adopted, which, however, does not mean that the present invention can only adopt this method. Other methods like the bottom-up method are also applicable.

When the computation domain of a PCE includes a network domain immediately, the PCE needs to store the TE information of the real network topology of the domain that is included in its computation domain. For instance, P11 in FIG. 1 stores the TE information of CD1. This means, P11 stores the topological connections among N10, N11, N12 and N13;

the information of links among these nodes, such as the link bandwidth, availability status, link ID, link protection type, shared risk link set and interface switching capability between N10 and N11; and other related TE information.

Figure 2:
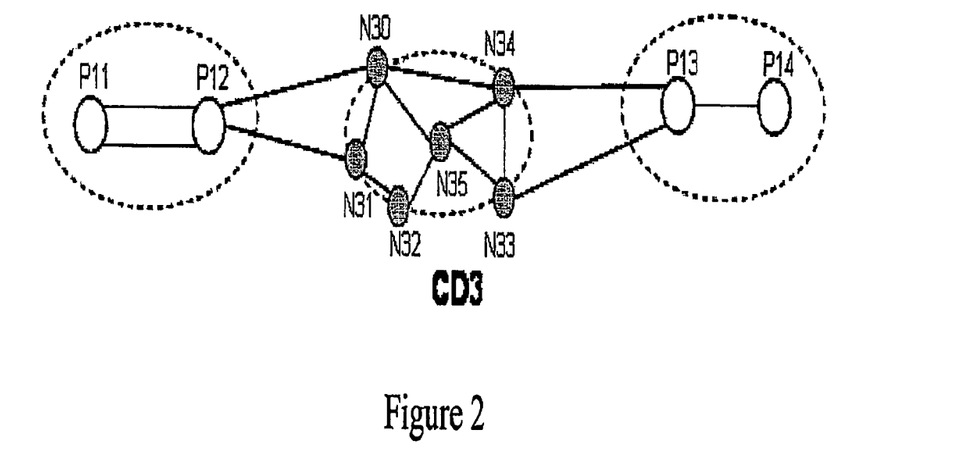
FIG. 2 shows the virtual topology of a system for multi-domain route computation according to an embodiment of the invention.

When a PCE has immediate lower layer PCEs, the PCE needs to store the TE information between the computation domains of the immediate lower layer PCEs. If the computation domain of the PCE further includes some networks, which are not included in the computation domain of any other PCE, the PCE also stores the TE information of these networks, the TE information between these networks, and the TE information between these networks and the computation domains included in its computation domain. From the perspective of P21 in FIG. 1, the topology is as shown in FIG. 2, which includes virtual nodes abstracted from CD1, CD2, CD3 and CD4 (for ease of description, the virtual nodes are represented by the corresponding PCEs. For instance, the virtual node abstracted from CD1 is represented by P11), all nodes in CD3, and the topology relations among these nodes (including virtual nodes). P21 stores the TE information of this virtual topology. This means, P21 stores the topological connections among P11, P12, N30, N31, N32, N33, N34, N35, P13 and P14; the information of links among these nodes, such as the link bandwidth, availability status, link ID, link protection type, shared risk link set and interface switching capability between P12 and N30; and other related TE information.

Figure 3:
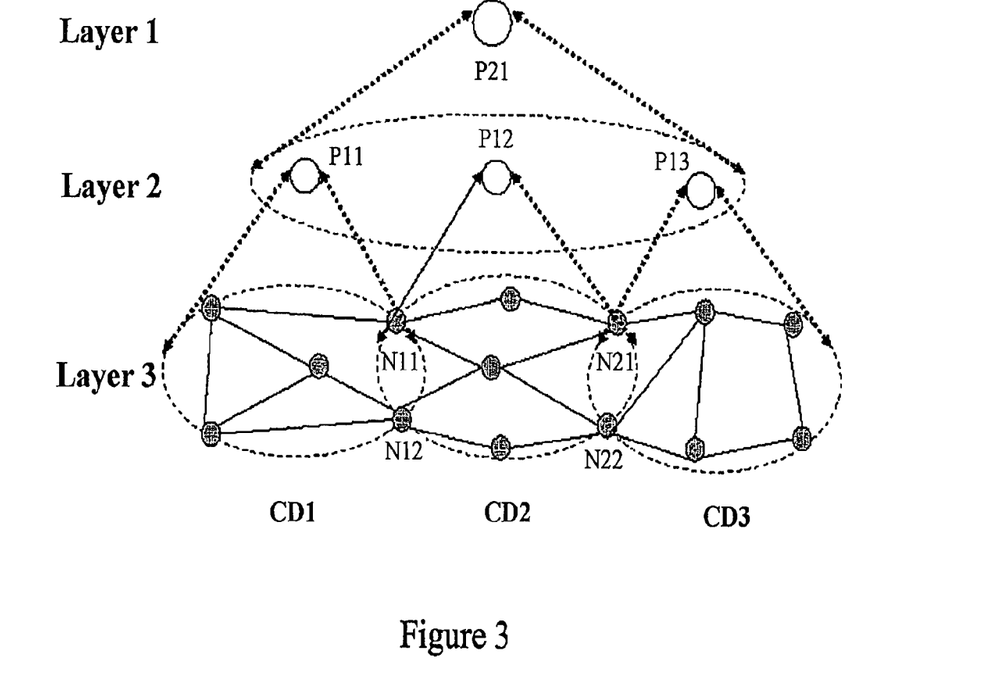
FIG. 3 shows a system for multi-domain route computation whose domains border on nodes according to an embodiment of the invention.
Figure 4:
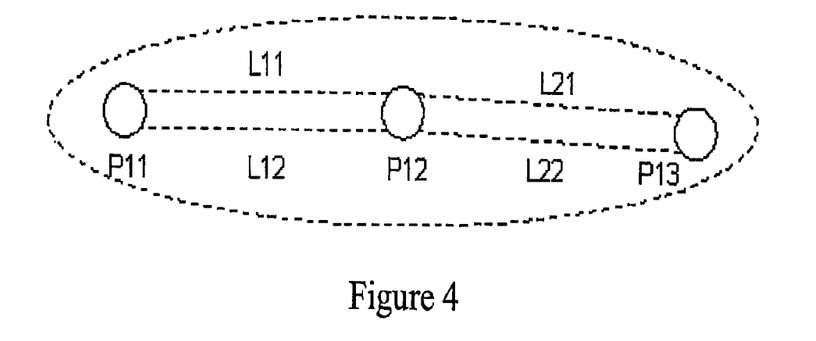
FIG. 4 shows the virtual topology of a system for multi-domain route computation whose domains border on nodes according to an embodiment of the invention.

In the system for multi-domain route computation illustrated in FIG. 1, the domains border on links. In fact, domains may also border on nodes, and in this case, an upper layer PCE regards a border node as a virtual link and converts the weight value of the node to that of the virtual link according to certain policies. In the process of route computation, selecting a virtual link means selecting a specific node. As shown in FIG. 3, CD1 and CD2 border on N11 and N12, and CD2 and CD3 border on N21 and N22. In this case, the top layer PCE P21 sees a vital topology shown in FIG. 4. Between virtual nodes P11 and P12 are two virtual links, which represent N11 and N12. Between virtual nodes P12 and P13 are also two virtual links, which represent N21 and N22.

An embodiment of the present invention provides a method for route computation. The following describes the implementation of the method according to the embodiments of the invention, with reference to the system shown in FIG. 1.

In the first embodiment of the method, when a user sends a command to establish a service connection between N10 and N13, route computation is carried out in the following procedure:

Step A: Determine a PCE whose computation domain may include both N10 and N13. Because when the source node N10 requests P11 whose computation domain includes N10, to do route computation, P11 may determine that the destination node N13 is also included in its computation domain. Therefore, it can be determined that P11 is the PCE whose commutation domain includes both N10 and N13. This means, P11 is the top layer PCE for this route computation.

Step B: P11 and its lower layer PCEs complete the route computation together. Because P11 has no immediate lower layer PCE, it does the route computation directly. The computation result is, for instance, N10→N11→N13.

In the second embodiment of the method, when a user sends a command to establish a service connection between N10 and N53, route computation is carried out in the following procedure:

Step A: Determine a PCE whose computation domain may include both N10 and N53. This step further includes:

Step A1: The source node N10 sends a request for route computation to P11 whose computation domain includes N10.

Step A2: P11 finds that N53 is not included in its computation domain, or the computation domain of P11 does not include N10 and N53 at the same time. Then P11 forwards the request for route computation to its immediate upper layer PCE, P21.

Step A3: P21 finds that N10 is included in the computation domain of P11, one of its immediate lower layer PCEs, and that N53 is included in the computation domain of P14, another of its immediate lower layer PCEs. This means the computation domain of P21 may include both N10 and N53. Therefore, P21 determines that it is the PCE whose computation domain may include both N10 and N53 simultaneously, i.e., the top layer PCE for this route computation.

Figure 5:
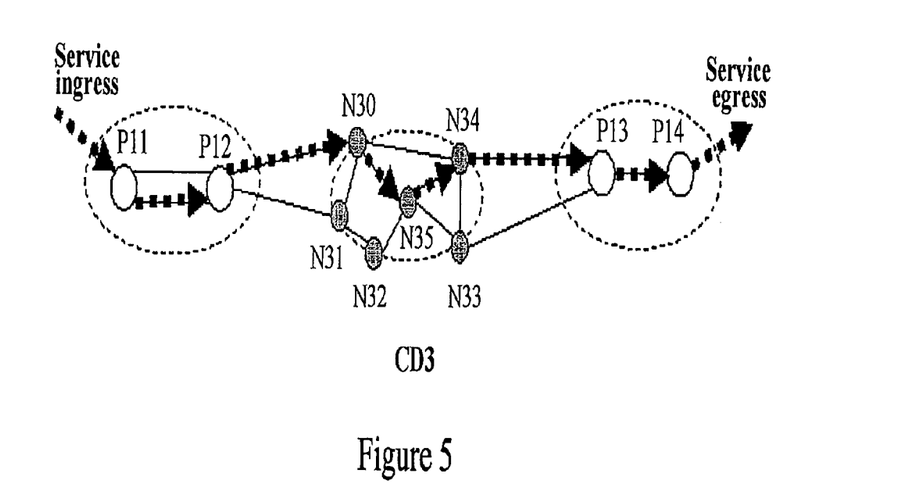
FIG. 5 shows the route computation result according to the first embodiment of the invention when P21 does not consider its lower layer route computation result.

Step B: P21 and its lower layer PCEs complete the route computation together. This step further includes:

Step B1: P21 completes the route computation in its computation domain. P21 stores the topology information of its computation domain as shown in FIG. 2. P21 needs to compute the route from P11 to P14. Note that P21 completes the route computation in CD3, which is not included in the computation domain of any of its immediate lower layer PCEs. For ease of description, the computation result is assumed to be P11→P12→N30→N35→N34→P13→P14, as shown in FIG. 5, wherein there are two links between P11 and P12. Suppose the lower link, which is the link between N13 and N21, is taken. The P12→N30 link is the link between N23 and N30. The N34-P13 link is the link between N34 and N40. The P13-P14 link is the link between N42 and N50.

Step B2: P21 sends computation tasks to its immediate lower layer PCEs according to its computation result so that the immediate lower layer PCEs complete their respective route computations. The immediate lower layer PCEs of P21 includes P11, P12, P13 and P14. They perform route computations in respective computation domains simultaneously. For ease of description, the following describes the computations in turn.

Figure 6:
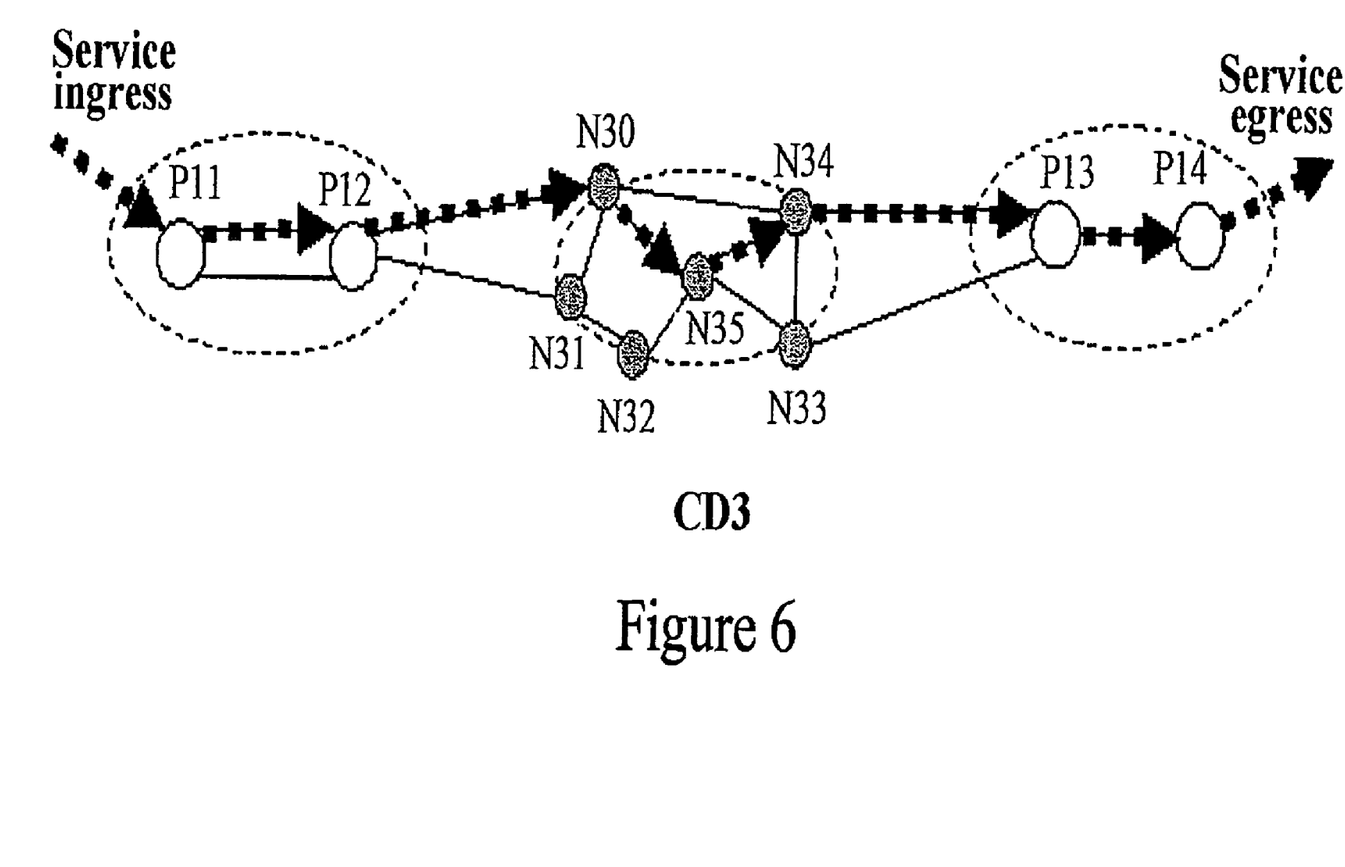
FIG. 6 shows the route computation result according to embodiments 2 and 3 of the invention when P21 considers its lower layer route computation result.

Route computation at P11: P11 needs to compute the route from source node N10 to destination node N13 in CD1. Suppose that P11 finds no route from N10 to N13 that matches the TE constraint and reports a failure message to P21, letting P21 re-compute the route from virtual node P11 to virtual node P12. The computation result of P21 is shown in FIG. 6. The route from P1 to P12 takes the N12-N20 link. P21 sends another computation task to P11, which then needs to compute the route from source node N10 to destination node N12 in CD1. The computation result of P11 is N10→N12.

Route computation at P12: P12 needs to compute the route from source node N21 to destination node N23 in CD2 and the computation result is N21→N22→N23. Because no route from N10 to N13 matching the TE constraint is found in CD1, P21 performs another route computation, the result of which is shown in FIG. 6. The route from P11 to P12 takes the N12-N20 link. This result is sent to P12 and P12 performs route computation again. In this case, P12 needs to compute the route from source node N20 to destination node N23 in CD2. The computation result is N20→N23.

Route computation at P13: P13 needs to compute the route from source node N40 to destination node N42 in CD4 and the computation result is N40→N42.

Route computation at P14: P14 needs to compute the route from source node N50 to destination node N53 in CD5 and the computation result is N50→N53.

P11, P12, P13 and P14 have no immediate lower layer PCEs and this step ends.

Figure 7:
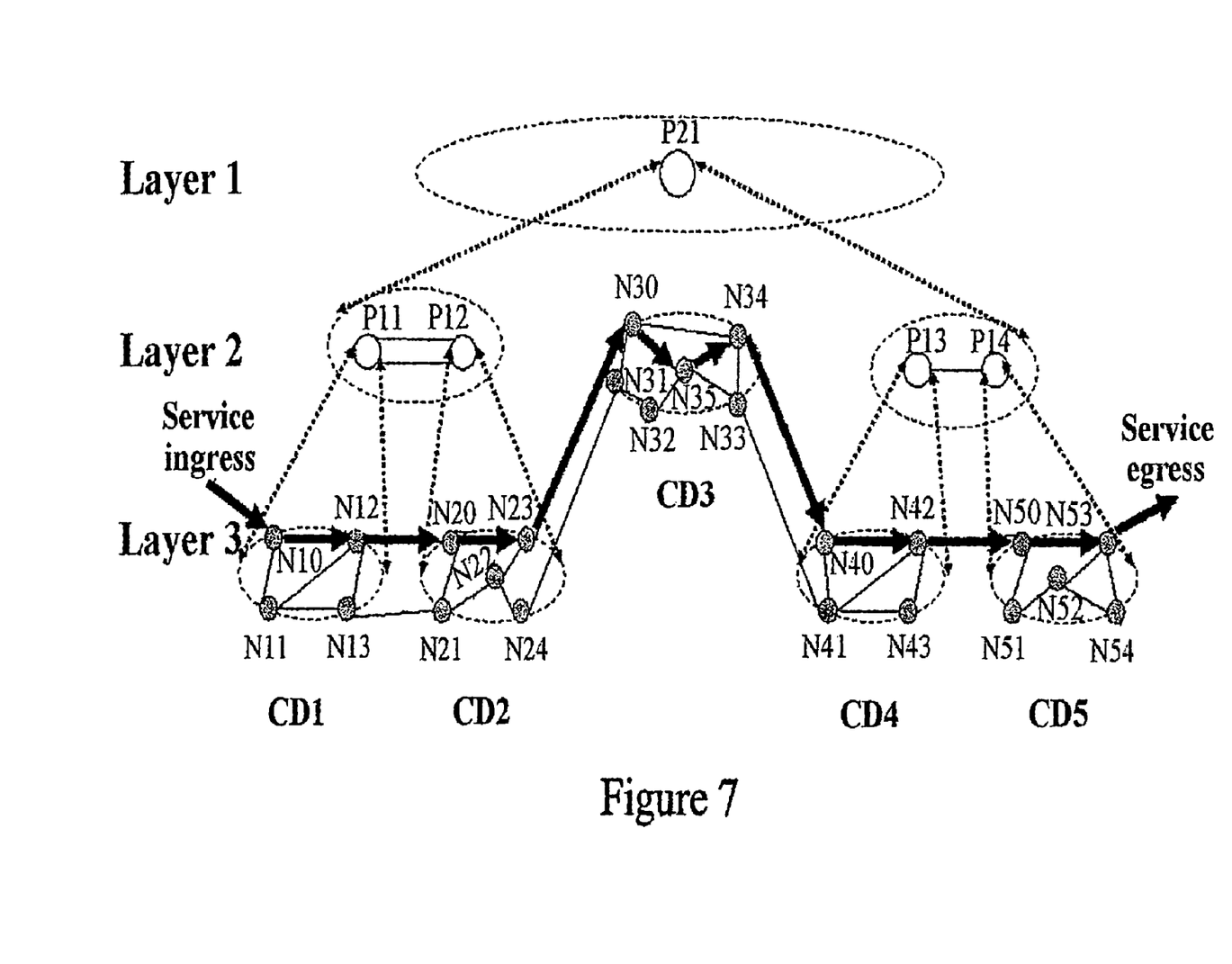
FIG. 7 shows the final route computation result according to embodiments 2 and 3 of the invention.

Step B3: PCE's send computation results from bottom up and P21 summarizes the results. For instance, P11 sends the computation result N10→N12 to P21; P12 sends the computation result N12→N23 to P21; P13 sends the computation result N40→N42 to P21; P14 sends the computation result N50→N50 to P21. Finally P21 summarizes the results and its own computation result P11→P12→N30→N35→N30→P13→P14 and gets the final result N10→N12→N23→N30→N35→N34→N40→N42→N50→N53 as shown in FIG. 7.

In the third embodiment of the method, when a user sends a command to establish a service connection between N10 and N53, route computation is carried out in the following procedure:

Step A: Determine a PCE whose computation domain may include both N10 and N53.

This step Her includes:

Step A1: Source node N10 sends a request for route computation to P11, whose computation domain includes N10; N10 (or P11) notifies destination node N53 to do route computation and N53 sends a request for route computation to P14, whose computation domain includes N53.

Step A2: P11 detects N53 is not included in its computation domain, which means the computation domain of P11 does not include N10 and N53 simultaneously. Therefore, P11 forwards the request for route computation to P21, which is its immediate upper layer PCE and sends its computation result N10→N12 to P21 for reference. P14 detects that N10 is not included in its computation domain, which means the computation domain of P14 does not include N10 and N53 simultaneously. P14, therefore, forwards the request for route computation to P21, which is its immediate upper layer PCE and sends its computation result N50 →N53 to P21 for reference.

Step A3: P21 finds that N10 is included in the computation domain of P11, one of its immediate lower layer PCEs, and that N53 is included in the computation domain of P14, another of its immediate lower layer PCEs. This means the computation domain of P21 may include both N10 and N53. P21, therefore, determines that it is the PCE whose computation domain may include both N10 and N53 simultaneously, or the top layer PCE for this route computation.

Step B: P21 and its lower layer PCEs complete the route computation together. This step further includes:

Step B1: P21 completes the route computation in its computation domain. P21 stores the topology information of its computation domain as shown in FIG. 2. P21 needs to compute the route from P11 to P14. Note that P21 completes the route computation in CD3, which is not included in the computation domain of any of its immediate lower layer PCEs. When doing route computation, P21 makes reference to the computation results sent by P11 and P14. At this time, P21 sees, in the virtual topology shown in FIG. 2, the egress link of virtual node P11 is the upper link, which is the link between N12 and N20, and gets the computation result P11→P12→N30→N35→N34→P13→P14, as shown in FIG. 6. The route from P11 to P12 takes the upper link. The P12→N30 link is the link between N23 and N30. The N34→P13 link is the link between N34 and N40. The P13→P14 link is the link between N42 and N50.

Step B2: P21 sends computation tasks to its immediate lower layer PCEs according to its computation result so that the immediate lower layer PCEs complete their respective route computations. The immediate lower layer PCEs of P21 includes P11, P12, P13 and P14. They perform route computations in respective computation domains simultaneously. For ease of description, the following describes the computations in turn.

Route computation at P11: P11 needs to compute the route from source node N10 to destination node N12 in CD1, which is, N10→N12, the computation result previously sent by P11.

Route computation at P12: P12 needs to compute the route from source node N12 to destination node N23 in CD2 and the computation result is N12→N23.

Route computation at P13: P13 needs to compute the route from source node N40 to destination node N42 in CD4 and the computation result is N40→N42.

Route computation at P14: P14 needs to compute the route from source node N50 to destination node N53 in CD5, which is, N50→N53, the computation result previously sent by P14.

P11, P12, P13 and P14 have no immediate lower layer PCEs and this step ends.

Step B3: PCEs send computation results from bottom up and P21 summarizes the results. For instance, P11 sends the computation result N10→N12 to P21; P12 sends the computation result N12→N23 to P21; P13 sends the computation result N40→N42 to P21; P14 sends the computation result N50→N53 to P21. Finally P21 summarizes the results and its own computation result P11→P12→N30→N35→N34→P13→P14 and gets the final result N10→N12→N23→N30→N35→N34→N40→N42→N50→N53, as shown in FIG. 7.

In the fourth embodiment of the method, when a user sends a command to establish a service connection between N10 and N53 from the network management system, route computation is carried out in the following procedure:

Step A: Determine a PCE whose computation domain may include both N10 and N53. In this case, the network management system determines that P21 is the PCE whose computation domain may include N10 and N53 simultaneously according to the information it stores.

Step B: P21 and its lower layer PCEs complete the route computation together. This step is similar to Step B in the second embodiment of the method for multi-domain route computation, thus no more description thereof will be given here.

It should be appreciated that the foregoing is only preferred embodiments of the invention and is not for use in limiting the invention Those skilled in the art can make various modifications and variations to the present invention without departing from the spirit and scope of the present invention. The present invention is intended to cover these modifications and variations provided that they fall into the scope of protection defined by the claims or their equivalents.

What is claimed is:

1. A method for multi-domain route computation, comprising:

determining a top layer Path Computation Element;

computing, by the top layer Path Computation Element, a route between computation domains of immediate lower layer Path Computation Elements of the top layer Path Computation Element, the top layer Path Computation Element sending route computation tasks to its immediate lower layer Path Computation Elements according to the route computation result;

computing, by a Path Computation Element which receives the route computation task, route between computation domains of its immediate lower layer Path Computation Elements if it is not a bottom layer Path Computation Element, and sending route computation tasks to its immediate lower layer Path Computation Elements according to the route computation result;

computing, by the bottom layer Path Computation Element, the route of its computation domain, and sending the route computation result to its immediate upper layer Path Computation Element;

sending, by a Path Computation Element which receives the route computation result, the route computation result received and a computation result computed by itself before to its immediate upper layer Path Computation Element, if the Path Computation Element receiving the route computation result is not the top layer Path Computation Element;

summarizing, by the top layer Path Computation Element, the route computation results and computing a route from a source node to a destination node.

2. The method according to claim 1, wherein the determining a top layer Path Computation Element comprises;

sending, by the source node or the destination node, a route computation request requesting a route computation to the Path Computation Element whose computation domain it belongs to;

forwarding, by the Path Computation Element which receives the route computation request, the route computation request to its immediate upper layer Path Computation Element if it is unable to complete the requested route computation, until a Path Computation Element which can complete the requested route computation, the Path Computation Element which can complete the route computation requested being determined as the top layer Path Computation Element.

3. The method according to claim 2, wherein:

a Path Computation Element whose computation domain includes both the source node and the destination node is able to complete the requested route computation, otherwise, it is unable to complete the requested route computation.

4. The method according to claim 1, further comprising:

if a computation domain of a Path Computation Element includes a computation domain which does not belong to its lower layer Path Computation Element, it computes the route between a computation domain of its immediate lower layer Path Computation Element and the computation domain which does not belong to its lower layer Path Computation Element.

5. The method according to claim 1, further comprising:

if the Path Computation Element which receives the route computation task does not get a conforming route after computing, the Path Computation Element feedbacks fault information to its immediate upper layer Path Computation Element to re-compute the route, until a Path Computation Element gets the conforming route after computing or until no Path Computation Element is able to get the conforming route after computing.

6. The method according to claim 1, further comprising:

if a computation domain of a Path Computation Element includes a computation domain which does not belong to its lower layer Path Computation Element, the Path Computation Element computes a route of the computation domain which does not belong to its lower layer Path Computation Element.

7. A system for multi-domain route computation, comprising at least 2 Path Computation Elements, wherein:

a Path Computation Element computes a route between computation domains of its immediate lower layer Path Computation Elements after it is determined as a top layer Path Computation Element, and sends route computation tasks to its immediate lower layer Path Computation Elements according the route computation result;

if a Path Computation Element which receives the route computation task is not a bottom layer Path Computation Element, it receives the route computation task and computes a route between computation domains of its immediate lower layer Path Computation Elements, and sends route computation tasks to its immediate lower layer Path Computation Elements according to the route computation result;

if a Path Computation Element which receives the route computation task is a bottom layer Path Computation Element, it computes the route of its computation domain;

wherein:

the bottom layer Path Computation Element further sends a route computation result computed by itself to its immediate upper layer Path Computation Element;

a Path Computation Element which is not a bottom layer Path Computation Element or a top layer Path Computation Element further sends a route computation result computed by itself and a route computation result received from its immediate lower layer Path Computation Element to its immediate upper layer Path Computation Element.

8. The system according to claim 7, further comprising:

a computation domain of a Path Computation Element including a computation domain which does not belong to its lower layer Path Computation Element, which further computes the route between a computation domain of its immediate lower layer Path Computation Element and said computation domain which does not belong to its lower layer Path Computation Element.

9. The system according to claim 7, wherein:

the Path Computation Element which is not the bottom layer Path Computation Element stores Traffic Engineering information of its immediate lower layer Path Computation Elements.

10. The system according to claim 7, wherein:

a Path Computation Element which is not the bottom layer Path Computation Element and a computation domain of which includes a computation domain which does not belong to its lower layer Path Computation Element, stores Traffic Engineering information of its immediate lower layer Path Computation Elements, Traffic Engineering information of the computation domain which does not belong to its lower layer Path Computation Element, and Traffic Engineering information between computation domain of its immediate lower layer Path Computation Element and the computation domain which does not belong to its lower layer Path Computation Element.

11. The system according to claim 7, wherein:

a Path Computation Element whose computation domain includes a computation domain which does not belong to its lower layer Path Computation Element, computes a route using the computation domain which does not belong to its lower layer Path Computation Element.

* * * * *